(12) United States Patent
Attaluri et al.

(10) Patent No.: US 9,672,248 B2
(45) Date of Patent: Jun. 6, 2017

(54) EMBRACING AND EXPLOITING DATA SKEW DURING A JOIN OR GROUPBY

(71) Applicant: International Business Machines Corporation, Armonk, NY (US)

(72) Inventors: Gopi K. Attaluri, Santa Clara, CA (US); Vijayshankar Raman, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 14/509,336

(22) Filed: Oct. 8, 2014

(65) Prior Publication Data

US 2016/0103879 A1    Apr. 14, 2016

(51) Int. Cl.
 *G06F 17/30* (2006.01)

(52) U.S. Cl.
 CPC .... *G06F 17/30466* (2013.01); *G06F 17/3033* (2013.01); *G06F 17/30498* (2013.01); *G06F 17/30598* (2013.01); *G06F 17/30917* (2013.01)

(58) Field of Classification Search
 CPC .......... G06F 17/3033; G06F 17/30346; G06F 17/30091; G06F 17/30498; G06F 17/30578; G06F 17/3076; G06F 17/30507; G06F 17/30466; G06F 17/30598; G06F 17/30917
 USPC ................................. 707/600–899
 See application file for complete search history.

(56) References Cited

U.S. PATENT DOCUMENTS

| | | |
|---|---|---|
| 5,598,559 A | 1/1997 | Chaudhuri |
| 5,893,086 A | 4/1999 | Schmuck et al. |
| 5,930,785 A | 7/1999 | Lohman et al. |
| 6,026,394 A | 2/2000 | Tsuchida et al. |
| 6,052,697 A | 4/2000 | Bennett |
| 6,292,795 B1 | 9/2001 | Peters et al. |
| 6,505,189 B1 | 1/2003 | On Au et al. |
| 6,609,131 B1 | 8/2003 | Zait et al. |
| 6,757,677 B2 | 6/2004 | Pham et al. |

(Continued)

OTHER PUBLICATIONS

List of IBM Patents or Patent Applications Treated as Related, May 6, 2015.

(Continued)

*Primary Examiner* — Isaac M Woo
(74) *Attorney, Agent, or Firm* — Erik K. Johnson; Edell, Shapiro & Finnan, LLC

(57) ABSTRACT

A hybrid approach for performing a join in a database includes: obtaining a distribution of data values in a join column of an inner table; using the distribution, identifying one or more data ranges containing skew; for each data range identified as containing skew, performing, by the processor, the join operation using a skew specific join scheme; and for each data range not identified as containing skew, performing, by the processor, the join operation using a non-skew specific join scheme. One skew specific join scheme involves a compact array table, a highly populated array that represents the range of values that the inner table join column contains. One non-skew specific join scheme involves a compact hash table, an optimized hash table that allows high load factors with a small memory overhead. In combining multiple join techniques, joins may be performed more efficiently for skewed and non-skewed data.

12 Claims, 8 Drawing Sheets

(56) References Cited

U.S. PATENT DOCUMENTS

| | | | |
|---|---|---|---|
| 6,775,681 B1 | 8/2004 | Ballamkonda et al. | |
| 6,941,432 B2 | 9/2005 | Ronstrom | |
| 6,954,776 B1 | 10/2005 | Cruanes et al. | |
| 7,062,481 B2 | 6/2006 | Pham et al. | |
| 7,287,131 B1 | 10/2007 | Martin et al. | |
| 7,293,028 B2 | 11/2007 | Cha et al. | |
| 7,308,539 B2 | 12/2007 | Fuhs et al. | |
| 7,343,363 B1 | 3/2008 | Parker | |
| 7,499,960 B2 | 3/2009 | Dageville et al. | |
| 7,653,670 B2 | 1/2010 | Hasan et al. | |
| 7,827,182 B1 | 11/2010 | Panigrahy | |
| 7,827,218 B1 | 11/2010 | Mittal | |
| 8,145,642 B2 | 3/2012 | Cruanes et al. | |
| 8,195,644 B2 | 6/2012 | Xu | |
| 8,271,564 B2 | 9/2012 | Dade | |
| 8,321,385 B2 | 11/2012 | Burroughs et al. | |
| 8,370,316 B2 | 2/2013 | Bensberg et al. | |
| 8,438,574 B1 | 5/2013 | Lyle et al. | |
| 8,443,155 B2 | 5/2013 | Adams et al. | |
| 8,661,005 B2 | 2/2014 | Mckenney et al. | |
| 8,768,889 B1 | 7/2014 | Martin | |
| 8,768,927 B2 | 7/2014 | Yoon et al. | |
| 9,292,560 B2 | 3/2016 | Attaluri et al. | |
| 9,311,359 B2 | 4/2016 | Attaluri et al. | |
| 9,317,517 B2 | 4/2016 | Attaluri et al. | |
| 9,317,548 B2 | 4/2016 | Attaluri et al. | |
| 9,367,556 B2 | 6/2016 | Attaluri et al. | |
| 9,405,858 B2 | 8/2016 | Attaluri et al. | |
| 2002/0016820 A1 | 2/2002 | Du Val et al. | |
| 2004/0260684 A1 | 12/2004 | Agrawal et al. | |
| 2005/0018683 A1 | 1/2005 | Zhao et al. | |
| 2005/0033741 A1 | 2/2005 | Dombroski et al. | |
| 2005/0149505 A1* | 7/2005 | Bossman | G06F 17/30536 |
| 2006/0218176 A1 | 9/2006 | Hsu et al. | |
| 2007/0136317 A1 | 6/2007 | Przywara | |
| 2007/0244850 A1 | 10/2007 | Hoppe et al. | |
| 2007/0245119 A1 | 10/2007 | Hoppe | |
| 2008/0126706 A1 | 5/2008 | Newport et al. | |
| 2008/0133583 A1 | 6/2008 | Artan et al. | |
| 2008/0162402 A1 | 7/2008 | Holmes et al. | |
| 2009/0006399 A1 | 1/2009 | Raman et al. | |
| 2009/0024568 A1 | 1/2009 | Al-Omari et al. | |
| 2009/0210445 A1 | 8/2009 | Draese et al. | |
| 2009/0222659 A1 | 9/2009 | Miyabayashi et al. | |
| 2010/0088309 A1 | 4/2010 | Petculescu et al. | |
| 2010/0114868 A1 | 5/2010 | Beavin et al. | |
| 2010/0131540 A1 | 5/2010 | Xu et al. | |
| 2010/0223253 A1 | 9/2010 | Gopal et al. | |
| 2011/0060876 A1 | 3/2011 | Liu | |
| 2011/0066593 A1 | 3/2011 | Ahluwalia et al. | |
| 2011/0078134 A1 | 3/2011 | Bendel et al. | |
| 2011/0283082 A1 | 11/2011 | McKenney et al. | |
| 2012/0011108 A1 | 1/2012 | Bensberg et al. | |
| 2012/0011133 A1 | 1/2012 | Faerber et al. | |
| 2012/0011144 A1 | 1/2012 | Transier et al. | |
| 2012/0036134 A1 | 2/2012 | Malakhov | |
| 2012/0117055 A1 | 5/2012 | Al-omari et al. | |
| 2012/0136846 A1 | 5/2012 | Song et al. | |
| 2012/0136889 A1 | 5/2012 | Jagannathan et al. | |
| 2012/0143877 A1 | 6/2012 | Kumar et al. | |
| 2012/0158729 A1 | 6/2012 | Mital et al. | |
| 2012/0166400 A1 | 6/2012 | Sinclair et al. | |
| 2012/0173517 A1 | 7/2012 | Lang et al. | |
| 2012/0260349 A1 | 10/2012 | Nagai et al. | |
| 2012/0303633 A1 | 11/2012 | He et al. | |
| 2012/0310917 A1 | 12/2012 | Sheinin et al. | |
| 2013/0138628 A1 | 5/2013 | Bensberg et al. | |
| 2013/0218934 A1 | 8/2013 | Lin et al. | |
| 2013/0325900 A1 | 12/2013 | Barber et al. | |
| 2014/0006379 A1 | 1/2014 | Arndt et al. | |
| 2014/0025648 A1 | 1/2014 | Corbett et al. | |
| 2014/0074819 A1 | 3/2014 | Idicula et al. | |
| 2014/0108489 A1 | 4/2014 | Glines et al. | |
| 2014/0129568 A1 | 5/2014 | Kim et al. | |
| 2014/0214794 A1 | 7/2014 | Attaluri et al. | |
| 2014/0214795 A1 | 7/2014 | Attaluri et al. | |
| 2014/0214855 A1 | 7/2014 | Attaluri et al. | |
| 2014/0215019 A1 | 7/2014 | Ahrens | |
| 2014/0337375 A1 | 11/2014 | Yue | |
| 2014/0372388 A1 | 12/2014 | Attaluri et al. | |
| 2014/0372392 A1 | 12/2014 | Attaluri | |
| 2014/0372407 A1 | 12/2014 | Attaluri | |
| 2014/0372411 A1 | 12/2014 | Attaluri et al. | |
| 2014/0372470 A1 | 12/2014 | Attaluri et al. | |
| 2015/0154218 A1 | 6/2015 | Attaluri | |
| 2016/0103879 A1 | 4/2016 | Attaluri et al. | |
| 2016/0103880 A1 | 4/2016 | Attaluri et al. | |
| 2016/0253390 A1 | 9/2016 | Attaluri et al. | |
| 2016/0275078 A1 | 9/2016 | Attaluri et al. | |
| 2016/0275145 A1 | 9/2016 | Attaluri et al. | |
| 2016/0275171 A1 | 9/2016 | Barber et al. | |
| 2016/0283538 A1 | 9/2016 | Barber et al. | |
| 2016/0283540 A1 | 9/2016 | Barber et al. | |

OTHER PUBLICATIONS

International Business Machines Corporation, "List of IBM Patents or Patent Applications Treated as Related", Oct. 1, 2014.

Chang, Shih-Fu; "Recent Advances of Compact Hashing for Large-Scale Visual Search", Columbia University, Oct. 2012, pp. 1-44.

Wang et al.; "Investigating Memory Optimization of Hash-Index . . . Sequencing on Multi-Core Architecture", IPDPSW IEEE 26th Inter. Conf. on, May 21-25, 2012, pp. 665-674.

Cutt et al.; "Improving Join Performance for Skewed Databases", IEEE, 2008, 5 pages.

Li et al.; "Adaptively Reordering Joins during Query Execution", IEEE, 2007, pp. 26-35.

Cleary, John, G., "Compact Hash Tables Using Bidirectional Linear Probing", IEEE Transactions on Computers, vol. C-33, No. 9, Sep. 1994, pp. 824-834.

Hua, Nan, et al., "Rank-Indexed Hashing: A Compact Construction of Bloom Filters and Variants", IEEE, 2008, pp. 73-82.

Xu, Yang, "A Multi-Dimesional Progressive Perfect Hashing for High Speed String Matching", 2011 Seventh ACM/IEEE Symposium on Architectures for Networking and Communications Systems, pp. 167-177.

Marek et al., TID Hash Joins, CIKM '04, Gaithersburg MD USA, pp. 42-49.

Yan, Weipeng P. et al., "Performing Group-By before Join [query processing]," Proceedings 10th International conference on Data Engineering, 1994, pp. 89-100, IEEE, 1994.

Anonymous, "System and Method for Usage Aware Row Storage in Database Systems", IP.Com, Jul. 23, 2010, IPCOM000197960D, pp. 1-4.

Anonymous, "Efficient Grouping Over Joins of Compressed Tables", IP.com, Apr. 6, 2010, pp. 1-6.

Anonymous, "High Performance Technique Using Join Collocation in a Massively Parallel Processing Relational Database Implementation", IP.com, Jun. 14, 2012, pp. 1-5.

Anonymous, CashMap: Processor Cache-Aware Implementation of Hash Tables, IP.com, Jul. 5, 2013, pp. 1-7.

Hu et al., "Rapid multi-dimension hierarchical algorithm in data warehouse system", Computer Integrated Manufacturing Systems, Jan. 2007, pp. 196-201, vol. 13, No. 1 China [English-language translation: Abstract Only].

Korn et al., "The VCDIFF Generic Differencing and Compression Data Format (RFC3284)", Network Working Group, IP.com, Jul. 1, 2002, pp. 1-31.

Raman et al., "DB2 with BLU Acceleration: So Much More than Just a Column Store", Proceedings of the VLDB Endowment, ACM, Aug. 2013, pp. 1-12, vol. 6, No. 11.

Mell, P., et al., "The NIST Definition of Cloud Computing", National Institute of Standards and Technology Special Publication 800-145, Sep. 2011, pp. 1-7, U.S. Department of Commerce.

Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10.

(56) References Cited

OTHER PUBLICATIONS

Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11.

Gao, H. et al., "Lock-free dynamic hash tables with open addressing", Journal of Distributed Computing, Jul. 2005, pp. 21-42, vol. 18, Issue 1.

Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library.

Prokopec, A. et al., "Lock-Free Resizeable Concurrent Tries", Languages and Compilers for Parallel Computing, 2013, pp. 156-170, vol. 7146, Springer Berlin Heidelberg, Germany.

Levandoski, J., et al., "The Bw-Tree: A B-tree for New Hardware Platforms", IEEE 29th International Conference on Data Engineering (ICDE), Apr. 8, 2013, pp. 1-12, IEEE.

Leis, V., et al., "The Adaptive Radix Tree: ARTful Indexing for Main-Memory Databases", IEEE 29th International Conference on Data Engineering (ICDE), Apr. 8, 2013, pp. 38-49, IEEE.

Lehman, T.J. "Design and Performance Evaluation of a Main Memory Relational Database System." 1986, PhD Dissertation, 334 pages, [Abstract Only], University of Washington, Madison, WI.

Spyros et al., "Design and Evaluation of Main Memory Hash Join Algorithms for Multi-core CPU's", SIGMOD Int'l Conference on Management of Data ACM, Jun. 12, 2011, pp. 1-12.

List of IBM Patents or Patent Applications Treated as Related, Feb. 24, 2016, 2 pages.

U.S. Appl. No. 13/918,313, filed Jun. 14, 2013, Not Yet Published.

U.S. Appl. No. 14/471,272, filed Aug. 28, 2014, Not Yet Published.

International Business Machines Corporation, "List of IBM Patents or Patent Applications Treated as Related", Oct. 16, 2014.

PCT International Search Report dated May 10, 2016, 4 pages.

List of IBM Patents or Patent Applications Treated as Related, Jan. 5, 2017, 2 pages.

* cited by examiner

EMBRACING AND EXPLOITING DATA SKEW DURING A JOIN OR GROUPBY

BACKGROUND

A join and a groupby are common operations in a relational database system. A join operation is used to combine rows from two or more tables in the database based on a common field between them. A groupby operation is used in conjunction with aggregate functions to group a result set by one or more columns. Common techniques for performing a join operation includes the merge-sort, nested-loop, and hash join. However, none of these techniques recognize or consider skew in the join columns. Skew in join columns occur when distinct values in a column are not uniformly distributed across the rows of a table. Skewed data can affect the query execution plan of queries containing a predicate and queries containing a join operation. However, the above techniques for performing a join operation, and also common techniques for performing a groupby operation, fail to recognize or consider skew in the join or aggregate columns.

SUMMARY

According to one embodiment of the present invention, during a query optimization for a query involving a join operation, a method for performing a join operation in a relational database obtains a distribution of data values in a join column of an inner table. Using the distribution, one or more data ranges containing skew are identified. For each data range identified as containing skew, the join operation is performed using a skew specific join scheme. For each data range not identified as containing skew, the join operation is performed using a non-skew specific join scheme.

In one aspect of the present invention, in identifying of the one or more data ranges containing skew, minimum and maximum values in the distribution are identified and outlier values are excluded. One or more densely populated ranges or cluster of ranges are identified. For each identified dense range, a cost benefit analysis is performed to determine an effectiveness of the skew specific join scheme for the identified dense range. One or more of the identified dense ranges are selected for the skew specific join scheme based on the cost benefit analysis.

In one aspect of the present invention, in identifying the one or more data ranges containing skew, a plurality of clusters of values in the distribution is identified. For each cluster, a median value is identified and a largest number of values in the cluster within a distance from the median value is selected which benefits from the skew specific join scheme.

In one aspect of the present invention, in selecting the largest number of values within the distance from the median value, for each cluster, a cost benefit analysis is performed to include values in increasing distance from the median value until a benefit from the skew specific join scheme drops below a threshold.

In one aspect of the present invention, in identifying the one or more data ranges containing skew, a plurality of bits in join keys of the inner table is obtained. Variant bits and invariant bits in the plurality of bits are identified, and the variant bits are defined as a data range containing skew.

In one aspect of the present invention, performing the join operating using the skew specific join scheme includes creating a compact array table. In creating the compact array table, keys in a database are identified, where the keys each have an associated value. Bits that are common between the keys are identified. The identified bits are removed to form condensed keys. The condensed keys are modulated using identified bits to create transformed keys. The one or more array tables are populated using the transformed keys and the keys' associated values.

In one aspect of the present invention, in performing of the join operation using a non-skew specific join scheme, a compact hash table is created. In creating the compact hash table, each empty bucket are removed from a hash table, and the non-empty buckets are compacted. A map of the hash table is generated to indicate a status of the buckets of the hash table. Data in the hash table are accessed by applying a hash key to the generated map to determine a corresponding bucket containing the data.

System and computer program products corresponding to the above-summarized methods are also described and claimed herein.

DETAILED DESCRIPTION

Figure 1:
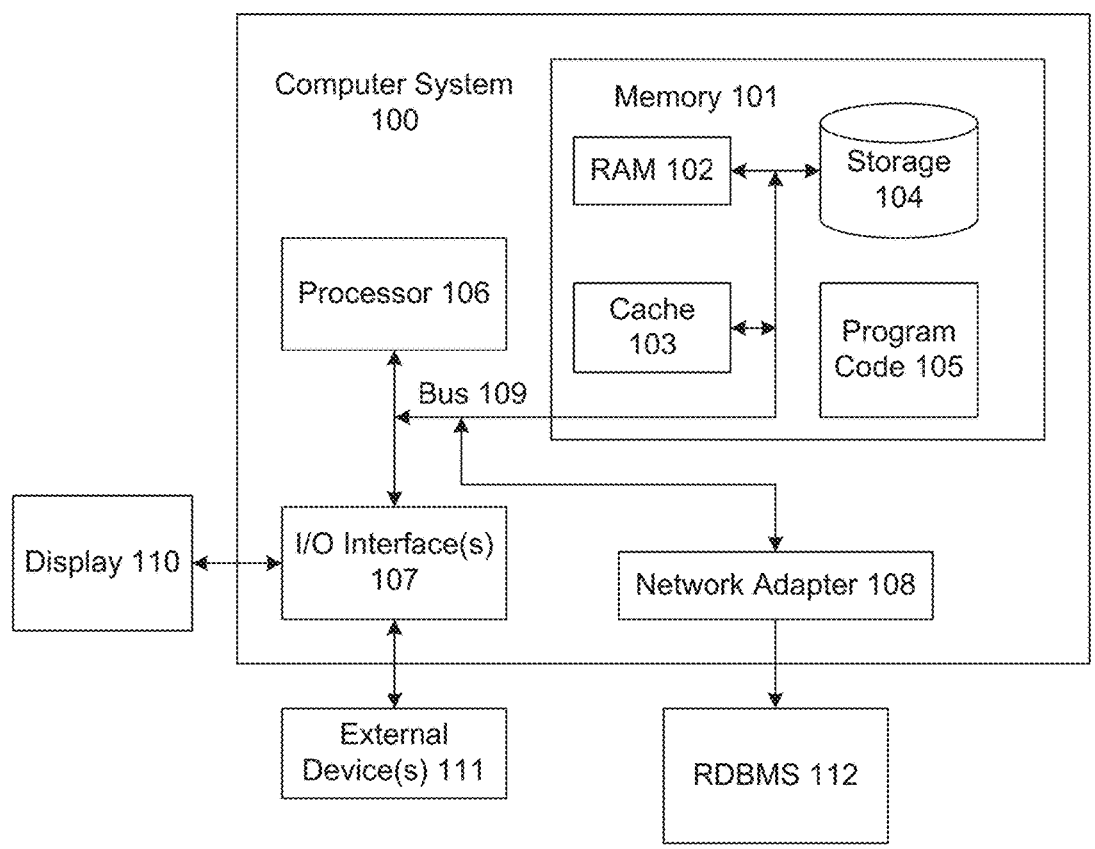
FIG. 1 illustrates a system for performing a join in a relational database according to embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention comprises a hybrid approach to exploit the skew, related to range and density, and perform a join in a relational database efficiently. For data ranges containing skew, a skew specific join scheme is used to perform the join operation. For the remaining non-skew data ranges, a non-skew specific join scheme is used to perform the join operation. By combining multiple join techniques in this manner, joins may be performed more efficiently for skewed and non-skewed data.

FIG. 1 illustrates a system for performing a join in a relational database according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the performance of a join in the relational database, according to embodiments of the present invention, when executed by the processor 106. The computer system 100 may also communicate with one or more external devices 111, such as a display 110, via I/O interfaces 107. The computer system 100 may communicate with one or more networks via network adapter 108.

Figure 2:
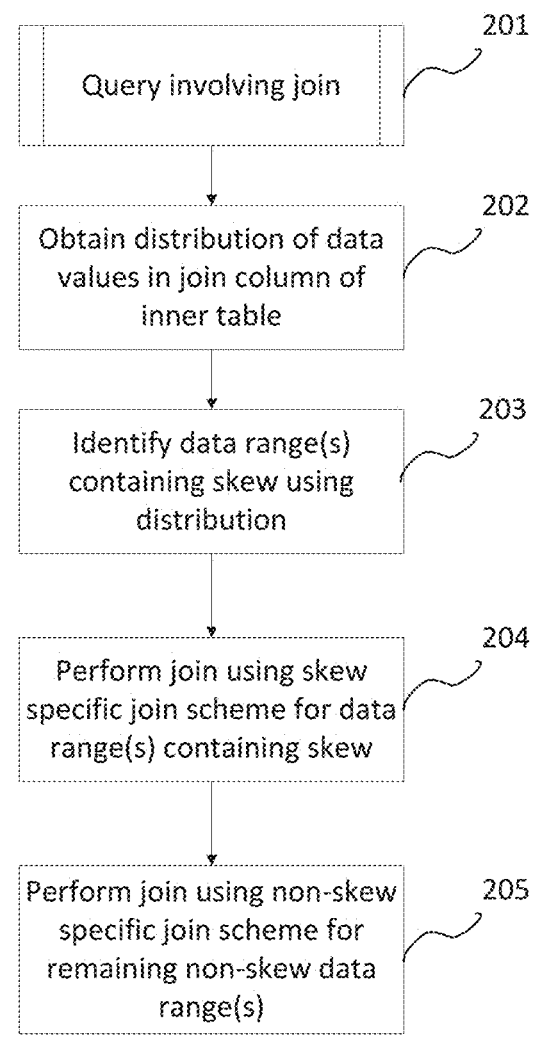
FIG. 2 is a flowchart illustrating a method for performing a join in a relational database according to embodiments of the present invention.

FIG. 2 is a flowchart illustrating a method for performing a join in a relational database according to embodiments of the present invention. When a query involves a join (201), the distribution of the data values in the join column of the inner table is obtained (202). Using the distribution, one or more data ranges are identified as containing skew (203). The join is then performed using a skew specific join scheme for the data range(s) containing skew (204). For the remaining non-skew data range(s), the join is performed using a non-skew specific join scheme (205). In one embodiment, statistics routinely gathered by a relational database system concerning data values during load and insert operations may be used to determine the distribution of the data values in the join column of the inner table. These statistics may be gathered during query optimization or before the query is compiled. In another embodiment, the data ranges may be identified during query runtime. In some situations, two passes or scans of the inner table are performed during query processing, such as for the partitioning of the hash table during build time. The present invention may leverage these scans to obtain actual data values from the inner table to determine the distribution of these data values (202). Using this distribution of actual data values, data ranges containing skew are then identified (203). In this embodiment, because the distribution of actual data values is used, the identification of data ranges containing skew may be more accurate.

Figure 3A:
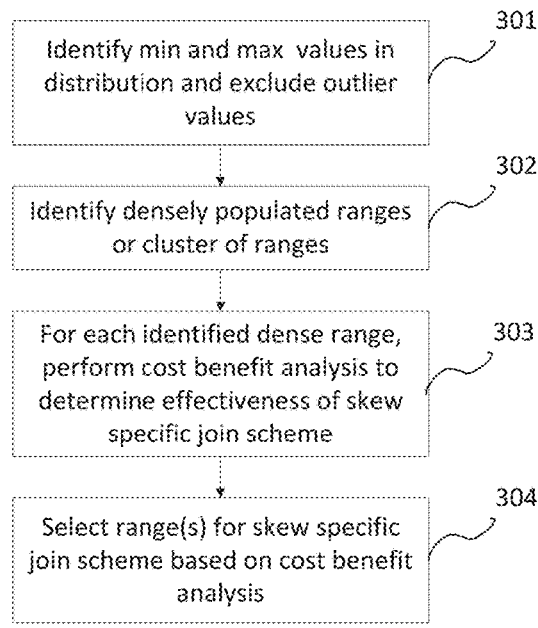
FIGS. 3A and 3B are flowcharts illustrating in more detail the identifying the one or more data ranges as containing skew, according to embodiments of the present invention.

FIG. 3A is a flowchart illustrating in more detail the identifying the one or more data ranges as containing skew, according to one embodiment of the present invention. First, the minimum and maximum values in the distribution are identified, and outlier values are excluded from the data set (301). From the remaining data values, densely populated ranges or cluster of ranges are identified (302). For each identified dense range, a cost benefit analysis is performed to determine the effectiveness of a skew specific join scheme on the range (303). The cost benefit analysis considers the tradeoff between the number of data values in the range and the additional overhead costs of processing this number of data values using the skew specific join scheme. One or more ranges are then selected for the skew specific join scheme based on the cost benefit analysis (304). During query execution, the join operation for the selected data range(s) would be performed using the skew specific join scheme. For example, a heuristic algorithm may be used to determine the top n most effective ranges that are available. Out of the top n ranges, a number of ranges are selected for the skew specific join scheme, depending on the total memory available. Other algorithms for selecting can be used. Alternatively, when the system provides a clear memory budget for query processing, the data ranges may be selected by selecting the largest number of data values that fit within the memory budget, without performing the cost benefit analysis.

Figure 3B:
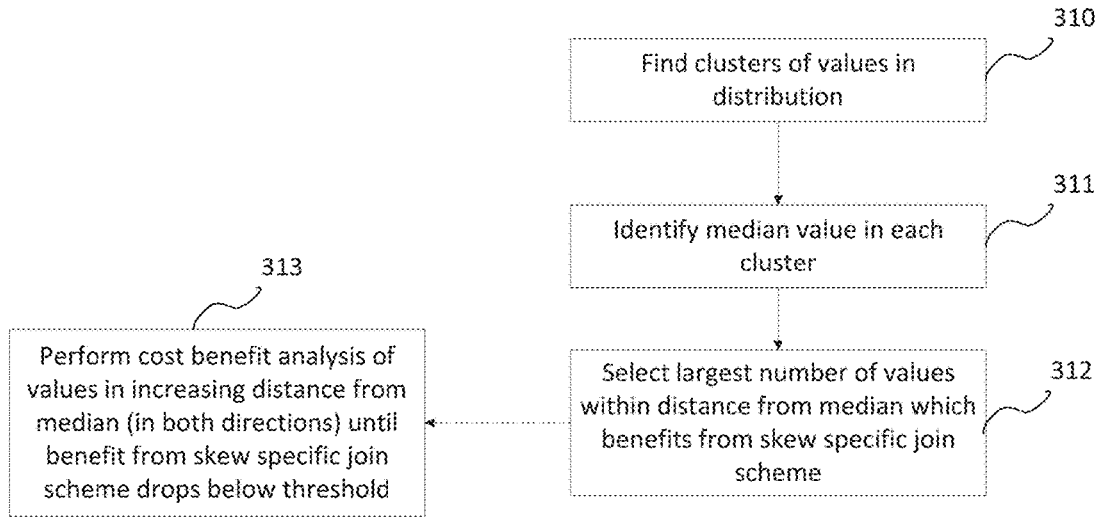

FIG. 3B is a flowchart illustrating in more detail the identifying the one or more data ranges as containing skew, according to another embodiment of the present invention. This embodiment specifically addresses identifying multiple ranges in the distribution of data values. First, clusters of values in the distribution are found (310). In each cluster, the median value is identified (311). Then, the largest number of values within distance from the median value, which benefits from the skew specific join scheme, is selected as a range (312). More specifically, the cost benefit analysis is performed to include values in increasing distance from the median value (in both directions) until the benefit that would be realized from the skew specific join scheme drops below a certain threshold (313). Steps 311-313 are repeated for each cluster of values found in the distribution. The join is then performed using the skew specific join scheme for these identified ranges (204, FIG. 2), while a non-skew specific join scheme is used for the remaining data non-skew data ranges (205, FIG. 2).

Optionally, instead of analyzing the data values in the join column inner table to identify data ranges containing skew, the bits in the join keys are analyzed instead. Here, the bits in the join keys are examined during runtime to identify variant and invariant bits. The variant bits are then defined as a range containing skew. In some situations, this approach results in ranges which are smaller than those that can be identified using the above described approaches, thus further reducing the memory consumption during query processing. This approach further has the advantage of being data type neutral. This technique also helps with composite join keys that comprise multiple columns.

Figure 4:
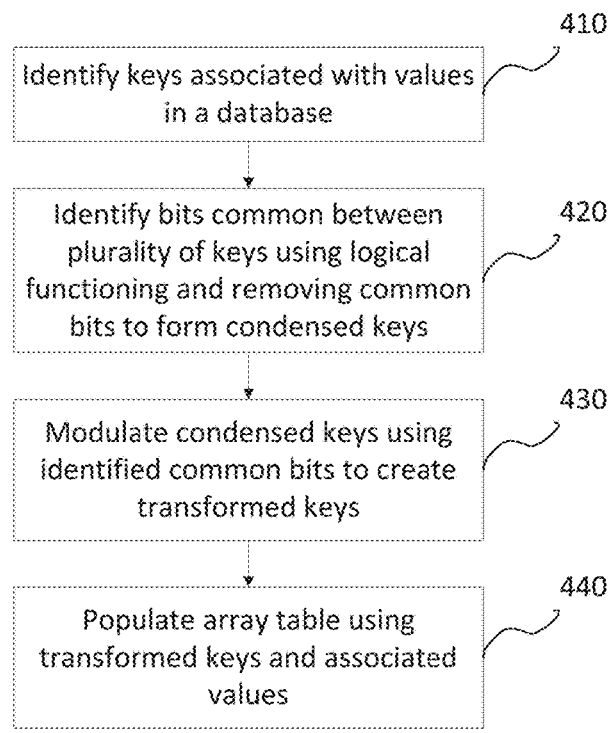
FIGS. 4 and 5 illustrate the creating of a compact array table according to embodiments of the present invention.
Figure 5:
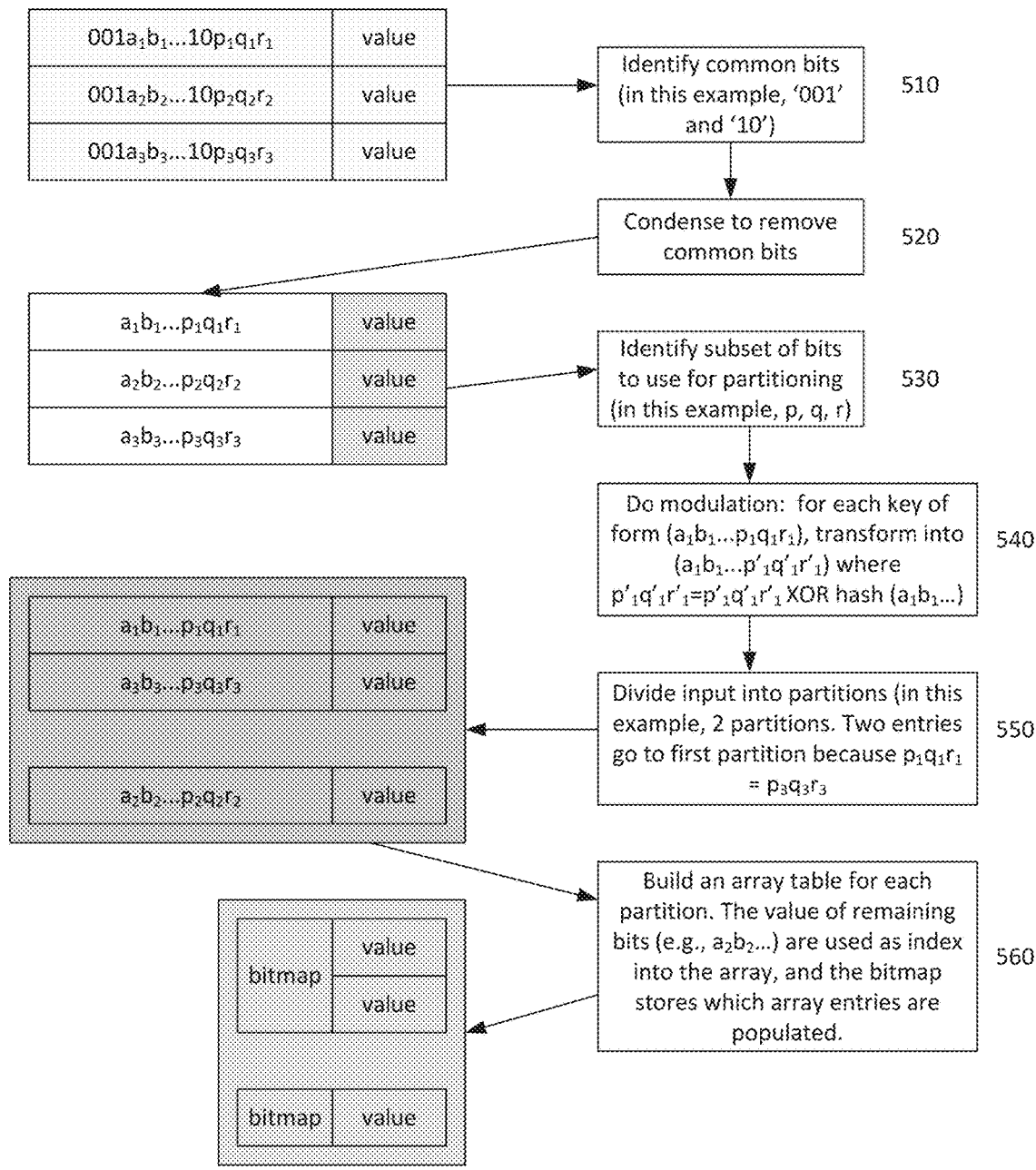

In the following section, one example of a skew specific join scheme is described to include a technique involving a data structure called a compact array table (CAT). The technique involving the CAT is described herein for illustrative purposes only. Other techniques for recognizing and exploiting data skew may also be used without departing from the spirit and scope of the present invention. The CAT is further described in related U.S. patent application Ser. No. 13/918,313, filed on Jun. 14, 2013, which is incorporated herein by reference. CAT is a highly populated array that represents the range of values that the inner table join column contains. FIGS. 4 and 5 illustrate the creating of a compact array table according to embodiments of the present invention. Referring to FIG. 4, keys associated with values in a database are identified (410). Bits common between the plurality of keys are also identified using logical functioning, and these common bits are removed to form condensed keys (420). The condensed keys are then modulated using identified common bits to create transformed keys (430). The array table is populated using the transformed keys and associated values (440). Referring to FIG. 5, in block 510 and block 520, common bits are identified and condensed similar to block 420 of FIG. 4 and numerical examples are provided for ease of clarity. In block 530, the subset of bits is identified for partitioning and modulation is provided in block 540 similar to block 430. Proceeding to block 550 and 560, an array table is built and populated using the partitioned input, similar to block 440.

Using the CAT scheme provided in FIGS. 4 and 5 reduces collisions. Under the techniques provided by the part art, hash collisions are practically unavoidable when hashing a random subset of a large set of possible keys. Statistically, when a sufficient number of keys are hashed into a large number of slots, even with a perfectly uniform random distribution, there is a good chance that at least two or more of the keys being hashed are provided to the same slot. Therefore, most hash table implementations have some collision resolution strategy to handle such events.

A critical statistic for a hash table is called the load factor. This is simply the number of entries divided by the number of slots, that is, the ratio n/k where n is the number of entries and k is the number of slots. If the load factor is kept reasonable, the hash table should perform but when the load factor grows too large, the hash table will become slow or even fail completely. A low load factor may not always be beneficial because as the load factor approaches zero, the proportion of unused areas in the hash table increases but there may not always be a reduction in search cost which leads to wasted memory. In addition, the variance of number of entries per slot is important. For example, if two tables both have X number of entries and X slots with one having exactly one entry in each slot while the other has all entries in the same slot, it becomes obvious that the latter will experience performance problems. For these reasons, there is a constant tradeoff between the hash table size and hash function complexity.

Referring back to FIG. 4, the CAT scheme provided in this embodiment provides for a sparse hash table. This means that there would be many more slots than provided by the hash keys. The smaller the size of hash table/number of keys, the more work is needed to make hash function perfect or deal with collisions. In one embodiment, such as the one discussed in conjunction with FIG. 4, a sparsely filled bitmap hashing scheme is provided. One example will now be used for ease of clarity with the understanding that alternate embodiments are possible. In this example, the hashing scheme provides for a compact hash table (HT) that only contains an entry for the used (1-bits) slots in the bitmap. Thus the size of compact HT is exactly equal to the actual number of keys. Furthermore, because the HT is collision-free, there is no need to store the keys but only the hash payloads. Payload is the part of a data stream which provides key information. Overhead data such as headers or metadata that solely facilitate delivery are omitted in the definition of a payload.

Referring back to FIG. 4, in one embodiment of the present invention, bits of the key itself are used as part of the hash value. This is instead of using the hashing function itself. Keys are usually dense because database administrators (DBAs) choose good surrogate keys. Furthermore, when the database management systems (DBMS) employ dictionary encoding, the encoded form of the key can be used which is even denser. The embodiment of FIG. 4, provides many advantages. One advantage is that there is no need to compute a hash value, and even when more traditional hashing schemes are used, the scheme has the advantage of avoiding wasting slots by compaction.

In one embodiment, logical reasoning such as in the form of computing a bitwise OR and/or a bitwise AND of all the keys is employed. This is to identify bits of the key that are constant (0s in the bitwise OR correspond to bits that are 0 in all keys, is in the bitwise AND are bits that are 1 in all keys). Subsequently the scheme condenses out those bits only and any remaining bits are used as the hash value to index into the bitmap. Thus this bitmap is highly dense. For example, suppose a two-column key array is utilized and that both columns are 32-bit numbers. The values in the first column range from 0 to 10M and those in the second column range from 0 to 1000. In performing the concatenation, out of 64 bits only (log(10M)+log(1000))=34 bits refer to non-empty slots. In addition, suppose that the scheme partitions the keys on the 10 bits from the LSB side (e.g., as part of doing a partitioned join). Then, even out of these 34 bits, 10 bits will be constant in all keys. So effectively, there is only a need to employ a bitmap of size 2 by 24 bits or 2 MB.

In one embodiment, to make the bitmap small, partitioning is on the bits of the key itself, instead, for example on the hash key. Logical partitioning can also be used. Suppose a scenario where the key has N bits of which and it is desired to use P bits for partitioning. A hash of the other N-P bits is then computed and logical functions such as a XOR are used with the P bits that are going to be used for partitioning. This is a bijective transformation (collision-free), so it is correct to perform the join predicate on the transformed key. At the same time, there are P bits for partitioning that are based on a hash.

The CAT scheme also deals with handling empty payloads. A degenerate but common case in joins is where there is no payload. In this case, there is no array-table, but simply the scheme uses bitmap to filter out outer tuples that do not have a match.

In one embodiment, the building of a CAT requires two passes over the join keys. The first determines the maximum condensation possible, and whether CAT is applicable. If CAT is chosen based on the first pass results, the second pass kicks in. In this second pass, all the join keys are condensed.

The second assumption implies that CAT would be chosen most of the time, except when the bit-size of the encoded join columns is increased beyond the pre-computed statistics of the largest key (i.e. how many bits are used). This exception forbids all keys from being condensed in the first pass. However, a second pass should be avoided because it could result in incorrect results if some keys are condensed but others are not because of non-CAT column values. In other words "Correctness" rules could be violated because a condensed key could be identical to a non-CAT column value. The condensation could be performed, however, (in the first pass with the second pass eliminated) by applying the following changes:

a) Condense if and only if no join column has a non-CAT value. If the join key is condensed, set the MSB, otherwise clear it.

b) Disable CAT and terminate the first pass if any join key could not be condensed. Undo the condensation and restore the original keys with MSB cleared. This should be rare but necessary for correctness.

On the build side, the analysis and condensation can also be performed to join keys. In one embodiment, based on the catalog data decide whether CAT is applicable to the join. After this, it would be disabled only in the rare case (presence of non-CAT values). If the CAT is applicable, perform these additional steps while concatenating a column value to a join key:

a) No CAT processing for unencoded keys/rows. Clear their MSB (which should be done during memory allocation anyway).

b) For the encoded keys/rows, check if any column value is non-CAT (cheap integer comparison when check encodability of the row). If so, disable CAT and terminate its further processing.

While concatenating an encoded key, condense each concat column based on the catalog data. If CAT is disabled for any reason, the condensed keys must be undone by the build evaluator. This optimization avoids the extra analysis in the build evaluator.

In the following section, one example of a non-skew specific join scheme is described to include a technique involving a data structure called a compact hash table (CHT). The technique involving the CHT is described herein for illustrative purposes only. Other techniques that do not recognize or exploit data skew may also be used without departing from the spirit and scope of the present invention. The CHT is further described in related U.S. patent application Ser. No. 13/753,769, filed on Jan. 30, 2013, which is incorporated herein by reference. CHT is an optimized hash table that allows high load factors with a small memory overhead. As described below, the CHT scheme reduces hash collisions in a hash table to improve the performance of the hash table. Hash collisions are practically unavoidable when hashing a random subset of a large set of possible keys. By way of example, if 1000 keys are hashed into 100,000 buckets, there is a small but not insignificant chance that at least two of the keys are hashed to the same slot or bucket even assuming a uniform random distribution, thereby resulting in a hash collision. As such, collision reduction is an important part of hash table design.

Conventionally, there is a tradeoff between the load factor and the hash collision rate. Typically, hash tables are not filled beyond about 50-60% because collision rates go up dramatically with fills beyond this amount. By having a fill rate below 50%-60%, the hash table will take up more space, and will fit lower in the cache hierarchy (e.g., as a Level 2 or Level 3 cache instead of as a Level 1 cache) and become slower to access, due to the lesser likelihood of getting a "hit" in the hash table because of the lesser number of entries in the hash table.

In one embodiment, the present invention conceptually (i.e., not physically) form an uncompacted hash table with very low fill factor, such as 25%, whereby with such a low fill factor, three out of every four buckets are empty (the fill factor refers to the fraction of buckets that are occupied). At this low fill factor, hash collisions are negligible. Then, in order to save space, the hash table is compacted and all empty buckets are eliminated. To mark which buckets are eliminated, a separate bitmap array is maintained (the bitmap array is sized to the full uncompacted hash table size), whereby a one-entry ("1") in the bitmap array corresponds to an occupied bucket, and whereby a zero-entry ("0") in the bitmap array corresponds to an unoccupied or empty bucket. The bitmap array may be implemented as an array of n-bit numbers (n being a positive integer multiple of two, for example), such as 64-bit numbers, in which there is one bitmap array entry for every 64 buckets of the uncompacted hash table. This embodiment of the present invention can also reduce cache misses by partitioning hash table joins to plural agents based on join column value frequency and their respective hash value.

Figure 6:
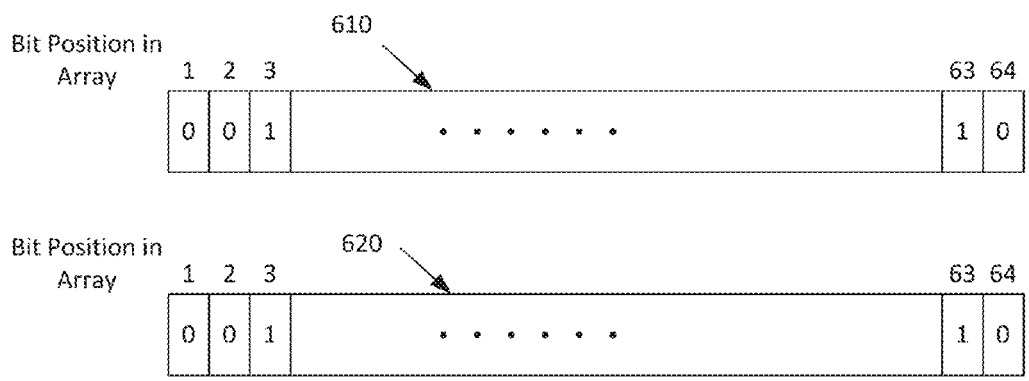

FIGS. 6-11 illustrate the creating of a compact hash table according to embodiments of the present invention. FIG. 6 illustrates an implementation of a bitmap array that may be utilized in embodiments according to the present invention. The bitmap array includes a first 64-bit bitmap entry 610 associated with the first 64 buckets in the hash table (e.g., buckets 1-64), and a second 64-bit bitmap entry 620 associated with the next 64 buckets (e.g., buckets 65-128) in the hash table, etc. The first bitmap array entry 610 indicates that bucket 1 and bucket 2 are empty, bucket 3 is occupied, . . . , bucket 63 is occupied, and bucket 64 is empty. The second bitmap array entry 620 indicates that bucket 65 (bucket 1 in this bitmap entry) is occupied, bucket 66 (bucket 2 in this bitmap entry) is occupied, bucket 67 (bucket 3 in this bitmap entry) is empty, . . . , bucket 127 is occupied, and bucket 128 is empty.

Figure 7:
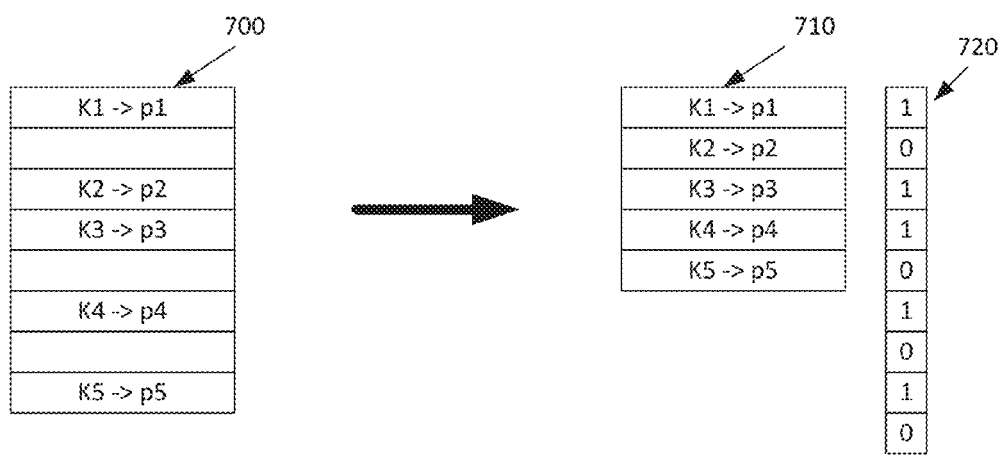

Reference is now made to FIG. 7, which shows a hash table 700 that can be compacted by the procedure above to arrive at a compacted hash table 710, and whereby a bitmap array 720 for the uncompacted hash table 700 is also shown. In more detail, the hash table 700 originally had four (4) unoccupied buckets and five (5) occupied buckets (with corresponding keys K1-K5 and pointers p1-p5) out of nine (9) buckets in total, resulting in a 5/9 fill factor. After compaction is performed, the compacted hash table 710 has five (5) occupied buckets, along with the array of bitmaps 720 for the nine buckets of the original non-compacted hash table 700.

When a lookup for a key to the hash table is desired, linear probing can be performed only in the bitmap array 720, which is much smaller in size than the hash table 700 and can easily fit into a Level 1 (L1) cache for fast searching.

Next, a population count can be performed in the bitmap array 720 to find the range of buckets to look at in the compacted hash table 710.

By creating a compacted hash table, memory space can be freed up due to the smaller size required for the compacted hash table and bitmap array as compared to the uncompacted hash table. This freed up memory space can be used for other applications, thereby lessening the amount of memory space required by a system.

Figure 8:
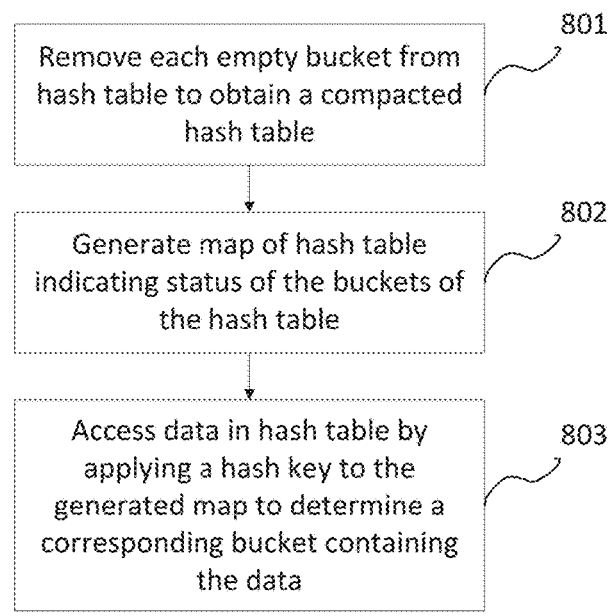
FIGS. 6-11 illustrate the creating of a compact hash table according to embodiments of the present invention.

FIG. 8 is a flowchart of a method of improving performance of an open addressing hash table by compacting the hash table according to embodiments of the present invention. Each empty bucket from a hash table is removed and the non-empty buckets remaining in the hash table are thereby compacted (801). A map of the hash table is generated, indicating a status of the buckets of the hash table (802). Data in the hash table is accessed by applying a hash key to the generated map to determine a corresponding bucket containing the data (803).

A preliminary bit map is built using the hash keys without actually populating any table. This enables the computation of the compacted hash table's size, and the building of a population count array. The unsorted hash keys are run through, and their insertion into the uncompacted hash table is simulated. A preliminary bit map entry "i" is set when the current hash key hashes to the uncompacted hash table bucket "i". Only the hash keys are read at this step, and the preliminary bit map is updated accordingly. When a hash key hashes to the uncompacted hash table bucket "j" and the bit "j" is already set, then the collision is handled by simulating linear hashing by iterating for an "unset" bit in the bit map and setting it when found. The population count array is then created by scanning the preliminary bit map and creating the population count array. Then, the actual bit map and the compacted hash table are created. This can be done by scanning uncompacted hash keys in the same order as before, whereby the bit map is set in the same way as the preliminary bit map. The difference is that the compacted hash table is populated in this step by computing its index from the population count array and the preliminary bit map. After this is performed, the preliminary bit map can be freed for use.

The uncompacted hash table (e.g., the hash table 700 in FIG. 7) can be large in some instances, and so it may fall into a lower level of the cache-memory hierarchy (e.g., level 2 or level 3 cache). Usually, the build side of a hash join is much smaller than the probe side of a hash join, and so this is typically not an issue to be concerned with. When this is not the case, such as when the hash table build time is significant, or when the memory consumption for the uncompacted hash table is prohibitive, an optimization may be performed in present invention embodiments that avoids constructing the uncompacted hash table and that directly builds the compacted hash table.

The optimization can be performed as follows. Given a set of keys and payloads, that set is sorted by the function hash(key). The sorted result is directly placed in an array, which forms the compacted hash table. The bitmap array is formed by simulating a hash table insertion algorithm of open addressing on the hash-sorted keys, without actually inserting those keys or payloads into any hash table, but by simply marking the bits in the bitmap array, so as to conceptually fill the buckets of the conceptual uncompacted hash table.

In cases where there are multiple collisions towards the end of the hash table, there may be provided extra bits beyond the hash table size (e.g., in the bitmap array), and so an allocation of more than the number of bits needed for the bitmap array can be made in present invention embodiments to provide for these extra bits and thus to reduce the number of collisions at the end of the hash table. For example, an allocation of twice the number of bits needed for the bitmap array can be made in present invention embodiments. These extra bits can be subsequently reused in present invention embodiments to hold the prefix population counts after the bitmap array is fully populated, so as to obtain a dual usage of these extra bits.

Present invention embodiments also can be used to cut down the number of hash key comparisons when a hash collision happens. Hash collision is an important performance issue, since it slows up the data retrieval process. Each hash collision adds significant cost in time and processing resources used, particularly if the join key is too big to use integer comparison (e.g., it requires the more expensive and time consuming memory comparison). Typically, when a collision happens in linear hashing, the memory comparison is repeated for each subsequent bucket in the hash table until a match occurs or an empty bucket is found in the hash table. The majority of these memory comparisons are wasteful because the data stored in the buckets being compared may have a different hash value. These wasteful memory comparisons can be reduced in present invention embodiments by attaching an attribute (e.g., a column) to the hash bucket, whereby the attribute indicates the hash value for the bucket.

Figure 9:
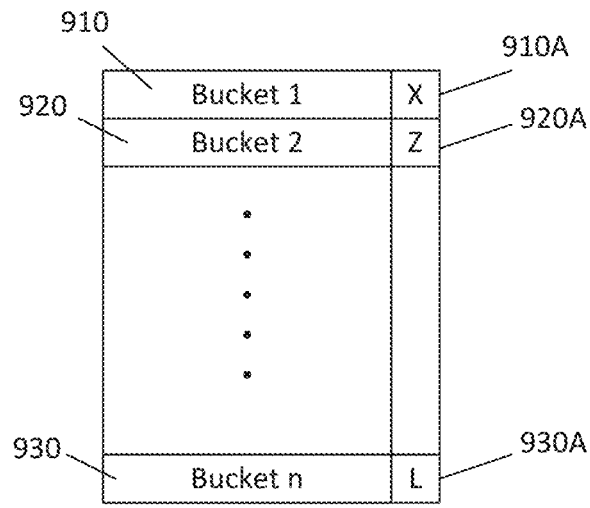

FIG. 9 shows one possible implementation of hash buckets provided with attribute data, whereby the hash buckets are provided within a hash table according to embodiments of the present invention. In particular, FIG. 9 shows hash buckets 910, 920, . . . , 930, each with its own attribute 910A, 920A, . . . , 930A provided as a separate column to the hash buckets. This addition of an attribute to the bucket avoids having to do expensive memory comparisons (in a time sense) when the bucket hash value does not match that of the key being looked up.

Alternatively, a bucket attribute can be added in the hash table that points to (or gives the index of) the next bucket hosting a key with the same hash value, which also avoids wasteful memory comparisons. This indexing of buckets that host a key with the same hash value allows for only the buckets that match a particular key to be processed in the hash table.

Figure 10:
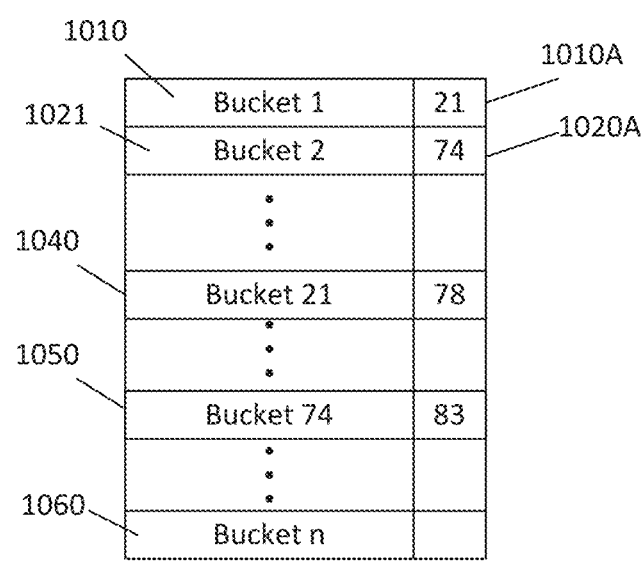

FIG. 10 shows another possible implementation of hash buckets provided with pointers, whereby the hash buckets are provided within a hash table according to embodiments of the present invention. In more detail, FIG. 10 shows a first bucket 1010 having a pointer 1010A as an additional column to that bucket entry, in which the pointer 1010A points to the next bucket entry 1040 (bucket 21) that hosts a key with the same hash value as the first bucket 1010. A second bucket 1020 has a pointer 1020A as an additional column to the bucket entry, in which the pointer 1020A points to the next bucket entry 1050 (bucket 74) that hosts a key with the same hash value as the second bucket 1020. The nth bucket 1060, which is the last bucket in the hash table, does not have a pointer associated with it, and so it does not point to another bucket that hosts a key with the same hash value as that bucket.

Present invention embodiments can also resolve issues related to open hashing, also referred to above as "chaining", which may result in wasted memory when the hashed data (including payload) is large. With open hashing, memory is wasted by the unused buckets that exist in a partially filled hash table. This situation gets worse as the load factor increases.

However, a large load factor may cause too many collisions. Present invention embodiments operate to resolve this issue by not embedding the hashed data in the hash table bucket, but instead storing the data separately, whereby a pointer to the separately-stored data is stored in the hash bucket. The pointer (or offset) may be an absolute address or an index into an array structure in order to save memory space. Also, de-referencing the pointer/offset does not cause a cache fault if the entire hash table is able to fit in a cache (e.g., a level 1 cache). When the hashed data is large, this approach allows the increase of the hash table fill factor regardless of the size of the hashed data, without suffering a higher hash collision rate.

Figure 11:
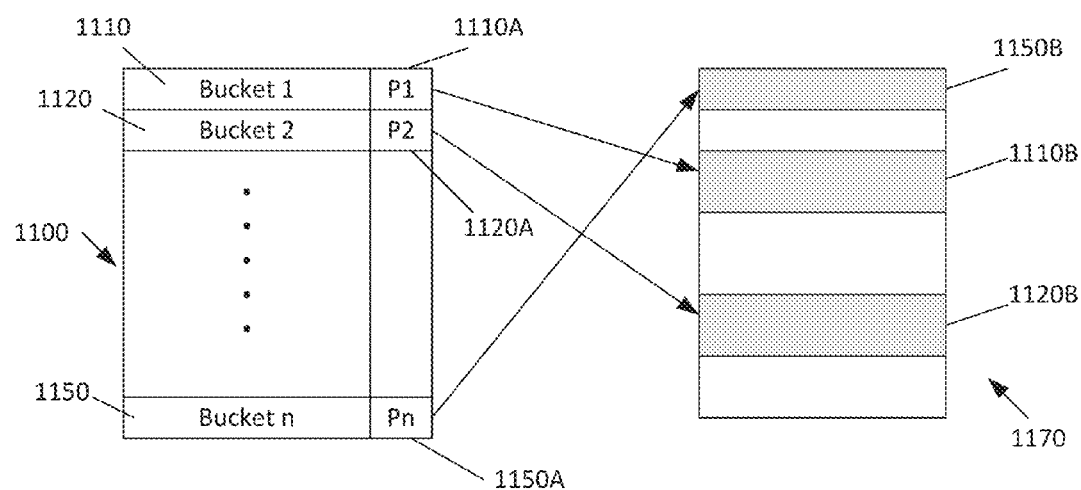

FIG. 11 shows an implementation of the above embodiment, in which a hash table includes buckets with pointers to a separate storage where additional data is stored. In more detail, FIG. 11 shows a hash table 1100 having buckets 1110, 1120, . . . , 1150, whereby each bucket has a pointer (column) P1 1110A, P2 1120A, . . . , Pn 1150A that points to a memory location in a separate storage 1170 that stores the hashed data payloads 1110B, 1120B, . . . , 1150B associated with the buckets. Arrows are shown that provide the pointers from the respective buckets 1110A, 1120A, . . . , 1150A in the hash table 1100 to their respective payloads 1110B, 1120B, . . . , 1150B in the separate storage 1170.

Present invention embodiments can also minimize collisions and lookups for hash keys that occur frequently in an outer leg of a hash table. A typical design of a hash table does not recognize that the frequency of join column values in the outer table can vary. Such a design limitation hurts the performance of hash table lookups because a collision involving a frequent join column value is quite hurtful in terms of data access and retrieval (that is, the hash look up cost in time lost and processing resources utilized due to the collision is multiplied by the frequency of the foreign key). In more detail, during a hash join, a hash table is built using the join column values of the inner leg (say Table B), and this hash table is probed for each outer leg row (say Table A) to create the join output. This probe can be inefficient if the hash table is larger and does not fit in a processor's cache (i.e., level 1 cache). To avoid this inefficiency, the inner leg's data can be partitioned into several smaller (and mutually exclusive) hash tables, whereby each of these hash tables are small enough to fit in the processor's cache. After the hash table is built, each agent (or software thread) fetches a set of rows from the outer leg and their join column values are probed in the hash table to perform the join. The hash table probe and join phases can be improved by partitioning the outer leg rows and by grouping the hash table lookups for a single hash table. This way, the agent loads the hash table into a processor's cache once, and looks it up repeatedly. Otherwise, the hash table has to be loaded and unloaded from the processor's cache multiple times, which is undesirable from a processing time perspective.

One problem with such a parallel hash table partitioning scheme as described above is that the same hash table may be accessed by multiple agents (and processors) at the same time, and as a result the hash table creates processor contention and gets transferred between different processors several times, resulting in cache misses. This limitation can be addressed in present invention embodiments by reducing cache misses for frequently occurring join column values as follows. When a hash table is built for the inner leg, the frequent join column values of the outer leg are inserted first, as join column values that are encoded with few bits. The infrequent join column values are then inserted last. As a result, during hash look up, the frequent join column values are likely not to experience any cache misses, thereby reducing the overall cost of hash lookup.

A dynamic optimization can also dynamically be performed in present invention embodiments during the 'probe' phase (the phase when lookups into the hash table are being performed), by tracking lookup frequency and periodically reorganizing the hash table. Reorganization may involve reinserting values into a new copy of the hash table, in order of decreasing lookup frequency.

Partitioning the rows of a hash table can be performed based on a simple hash value of the join columns and their frequency. Typically, the rows are partitioned using a simple hash of the join column values, and a separate hash table is built for each partition. Such a design involves several assumptions: (1) all partitions contain approximately the same number of input rows; (2) the hash table for each partition fits the processor's cache; and (3) the same load factor may be used for all hash tables because cache misses are equally bad for any partition.

However, since cache misses cause more cost and time consumption for frequently occurring join column values, one possible way to decrease cache misses is to increase the load factor for a hash table with frequent join column values, and to reduce the load factor for a hash table with infrequent join column values (whereby the total memory used for the hash tables remains the same). However, the join column value frequency would not be considered for changing the load factor of a hash table if the rows are partitioned by using just the hash value.

Accordingly, present invention embodiments address this problem by partitioning using both the join column value frequency and their hash value. For example, the join column values can be divided into several sets based on their frequency. Each set can be further divided using the hash value. That way, the join column value frequency would be considered for changing the load factor of a hash table even if the rows are partitioned by using just the hash value. Further, a bigger load factor can be used for the sets of frequent join column values, to increase hash table access efficiency.

According to some present invention embodiments to reduce the frequency of cache misses, an agent partitions the inner leg's rows of a hash table into multiple small hash tables instead of a single hash table, such that each hash table can fit into a processor's cache. The partitioning can be determined, for example, by a simple and efficient hash-like-function on the joining columns of the inner leg. To join the outer leg with the inner leg, each agent fetches a set of rows from the outer leg (table), and partitions each outer leg row using the hash-like-function (the same function that was used on the join columns of the inner leg to partition the inner leg rows into multiple hash tables) on the outer leg's joining columns. This partitioning determines the hash table to be probed for that particular outer leg row. After this partitioning, the agent performs all the probes/joins for a particular hash table before moving on to the next hash table. This scheme increases the cache locality because the agent avoids memory random access due to having to access a single large hash table that does not fit in the processor's cache.

The above scheme improves cache locality, but increases processor cache contention when the same hash table is probed by multiple agents/processors. To reduce this contention, the agents can be formed into one or more exclusive groups when they need to probe the inner leg's hash tables to join a set of outer leg rows. Work can be pooled and shared among a group of agents such that a single hash table is less likely to be probed by multiple agents/processors at the same time.

The agent groups can be created and managed as follows. The system is started with zero groups. When an agent obtains a set of outer leg rows to process, it checks if an "open" group exists. If no open group exists, the agent creates a new group in the "open" state and adds itself to this new group. A group is considered "open" if its members (agents) are not finalized, and work has not distributed to those members yet. If an open group already exists, the agent adds itself to that open group. After adding itself to a group, the agent proceeds to partition its input (outer leg rows) to determine the target hash table for each input row. It then pools this input into the total work for its group. The agent then waits for all other member agents to partition their input and add their work to the group.

When all the agents have partitioned their input and added their work to the group, the group becomes "closed" and no new members are allowed to join the group. The pooled work is then distributed to the member agents to minimize processor cache contention. This step is a sync-point for the group members because a member cannot start the join work on the outer leg rows until the group is closed and the group's input rows are known.

A free agent is assigned all the input rows that are needed to probe a particular hash table. The agent is responsible for probing that hash table and joining the assigned input rows. When this assignment is completed, the agent becomes free and can request new work.

If an agent is free but no new work is available (i.e., because the work has been assigned to other members and is being processed), that agent waits for all other members in the group to finish.

When all the agents become free (i.e., all the input rows are processed), the members exit the group, and the group is terminated. This step is also a sync-point for the group members because the members cannot exit the group and perform other work on their next set of outer leg rows until they exit the group.

Additional constraints can be added to provide for optimal hash table access. One constraint that may be added is that an agent cannot join a group if its input is too small. If the agent has very few input rows, the agent can process that input quickly by itself, and does so. The overhead of joining a group and pooling the work may not be justified in this case.

Another constraint that may be added is that an agent may be allowed to exit a group before it is closed if the group is too small to justify the overhead of pooling work. This allows a small group to be disbanded because the members may be able to process their individual input more efficiently, without the group overhead (the two sync-points described above and other overhead).

Yet another constraint that may be added is that a group may not be closed immediately after all the members have partitioned and added their input to the group. Instead, the group may be kept open for a certain time period if it is too small (not enough members joined) to allow more members to join the group. This constraint achieves more efficient hash table accessing since a bigger group facilitates more effective pooling of work. Also, a bigger group minimizes the number of groups, which is important because groups contend with each other when they probe the same hash table.

The parallel hash table partitioning scheme has some drawbacks with respect to cache misses. Present invention embodiments overcome these drawbacks by having the agents pool their work so that each partition (hash table) is processed by a single agent at any given time, thereby resulting in reduced cache misses. When the agent finishes processing the hash table, it picks up the next available hash table to process, whereby the agents continue to work in parallel until all of the hash tables are searched. The agents can be assigned to different groups in the manner as described earlier with respect to a present invention embodiment, whereby agents in each group pool their work to obtain "group work", and whereby the agents perform the group work such that no agent in the same group accesses the same hash table as another agent in the same group at the same time.

Additionally, a data skew problem may exist in which an outer leg row maps to the same hash table and whereby the same hash table needs to be probed by an agent. This data skew problem can be resolved in present invention embodiments by allowing the same hash table to be probed by multiple agents and by dividing the work along input boundaries. That is, the input from an agent (the outer leg rows scanned by that agent for probing against the hash table) is given to one of the agents, and the input from a single agent to probe a particular hash table is not distributed amongst multiple agents. Accordingly, data copy is minimized and cache locality is improved (e.g., less cache misses).

Although the non-skew specific join scheme is described above as a CHT, other join schemes that do not recognize or exploit data skew, including general purpose hash scheme or non-hash schemes, may also be used without departing from the spirit and scope of the present invention.

Although the embodiments of the present invention are described in the context of the join operation, the techniques described above may be equally applied to groupby operations as well.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for performing a join operation in a database, the computer program product comprising a computer readable storage medium having program instructions embodied therewith, the program instructions executable by a processor to cause the processor to perform:
   during a query optimization for a query involving a join operation, obtaining a distribution of data values in a join column of an inner table;
   using the distribution, identifying one or more data ranges containing skew;
   performing a cost-benefit analysis for a skew specific join scheme, wherein the cost benefit analysis is based on a tradeoff between a number of the data values in a data range of the one or more data ranges and additional overhead costs of processing the number of data values using the skew specific join scheme;
   for each data range identified as containing skew, performing, by the processor, the join operation using the skew specific join scheme based on the cost-benefit analysis; and
   for each data range not identified as containing skew, performing, by the processor, the join operation using a non-skew specific join scheme.

2. The computer program product of claim 1, wherein the identifying of the one or more data ranges containing skew comprises:
   identifying minimum and maximum values in the distribution and excluding outlier values; and
   identifying one or more densely populated ranges or cluster of ranges.

3. The computer program product of claim 1, wherein the identifying of the one or more data ranges containing skew comprises:
   finding a plurality of clusters of values in the distribution;
   for each cluster, identifying a median value; and
   for each cluster, selecting a largest number of values in the cluster within a distance from the median value which benefits from the skew specific join scheme.

4. The computer program product of claim 3, wherein the performing the cost benefit analysis comprises:
   for each cluster, performing the cost benefit analysis to include values in increasing distance from the median value until a benefit from the skew specific join scheme drops below a threshold.

5. The computer program product of claim 1, wherein the identifying of the one or more data ranges containing skew comprises:
   obtaining a plurality of bits in join keys of the inner table;
   identifying variant bits and invariant bits in the plurality of bits; and
   defining the variant bits as a data range containing skew.

6. The computer program product of claim 1, wherein the performing of the join operating using the skew specific join scheme comprises creating a compact array table, comprising:
   identifying keys in a database, the keys each having an associated value;
   identifying bits that are common between the keys;
   removing the identified bits to form condensed keys;
   modulating the condensed keys using identified bits to create transformed keys; and
   populating the one or more array tables using the transformed keys and the keys' associated values.

7. The computer program product of claim 1, wherein the performing of the join operation using a non-skew specific join scheme comprises creating a compact hash table, comprising:
   removing each empty bucket from a hash table and compacting the non-empty buckets;
   generating a map of the hash table indicating a status of the buckets of the hash table; and
   accessing data in the hash table by applying a hash key to the generated map to determine a corresponding bucket containing the data.

8. A system, comprising:
   a processor; and
   a computer readable storage medium having program instructions embodied therewith, the program instructions executable by the processor to cause the processor to perform:

during a query optimization for a query involving a join operation, obtaining a distribution of data values in a join column of an inner table;

using the distribution, identifying one or more data ranges containing skew;

performing a cost-benefit analysis for a skew specific join scheme, wherein the cost benefit analysis is based on a tradeoff between a number of the data values in a data range of the one or more data ranges and additional overhead costs of processing the number of data values using the skew specific join scheme;

for each data range identified as containing skew, performing, by the processor, the join operation using the skew specific join scheme based on the cost-benefit analysis; and for each data range not identified as containing skew, performing, by the processor, the join operation using a non-skew specific join scheme.

9. The system of claim 8, wherein the identifying of the one or more data ranges containing skew comprises:

identifying minimum and maximum values in the distribution and excluding outlier values; and identifying one or more densely populated ranges or cluster of ranges.

10. The system of claim 8, wherein the identifying of the one or more data ranges containing skew comprises:

finding a plurality of clusters of values in the distribution;

for each cluster, identifying a median value; and for each cluster, selecting a largest number of values in the cluster within a distance from the median value which benefits from the skew specific join scheme.

11. The system of claim 8, wherein the performing the cost benefit analysis comprises:

for each cluster, performing the cost benefit analysis to include values in increasing distance from the median value until a benefit from the skew specific join scheme drops below a threshold.

12. The system of claim 11, wherein the identifying of the one or more data ranges containing skew comprises:

obtaining a plurality of bits in join keys of the inner table;

identifying variant bits and invariant bits in the plurality of bits; and defining the variant bits as a data range containing skew.

* * * * *